(12) United States Patent
Arkhipov et al.

(10) Patent No.: US 7,707,191 B2
(45) Date of Patent: Apr. 27, 2010

(54) SYNCHRONIZING UNDO/REDO OPERATIONS BETWEEN DIFFERENT DOCUMENT VIEWS

(75) Inventors: Mikhail E. Arkhipov, Woodinville, WA (US); Charles Y. Bissonnette, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 11/624,578

(22) Filed: Jan. 18, 2007

(65) Prior Publication Data

US 2008/0177800 A1   Jul. 24, 2008

(51) Int. Cl.
G06F 7/00 (2006.01)
G06F 17/00 (2006.01)
G06F 12/00 (2006.01)
G06F 17/30 (2006.01)

(52) U.S. Cl. .................. 707/684; 707/615; 715/522
(58) Field of Classification Search ................ None
See application file for complete search history.

(56) References Cited

U.S. PATENT DOCUMENTS

| | | | |
|---|---|---|---|
| 5,479,601 A * | 12/1995 | Matheny et al. ............. 715/700 |
| 6,585,777 B1 | 7/2003 | Ramaley et al. ............. 715/513 |
| 6,674,924 B2 | 1/2004 | Wright et al. ............... 382/306 |
| 6,848,078 B1 | 1/2005 | Birsan et al. ................ 715/511 |
| 6,907,420 B2 | 6/2005 | Gensel .......................... 707/1 |
| 6,956,416 B2 | 10/2005 | Wilson et al. ............... 715/513 |
| 6,963,930 B2 | 11/2005 | Halpert et al. .............. 709/246 |
| 7,080,083 B2 | 7/2006 | Kim et al. ................... 707/100 |
| 2002/0059345 A1* | 5/2002 | Wang et al. ................. 707/513 |

\* cited by examiner

*Primary Examiner*—Charles Rones
*Assistant Examiner*—Harold A Hotelling
(74) *Attorney, Agent, or Firm*—Workman Nydegger (57) ABSTRACT

The present invention extends to methods, systems, and computer program products for synchronizing undo/redo operations between different document views. A unified undo stack uniformly stores undo operations and information for multiple views of a document. When a change in first view is detected, the first view submits an undo unit for storage in a global undo unit in the unified undo stack. A second view is notified of the detected change in the first view. In response, the second view submits an undo unit for storage in the global undo unit. Accordingly, undo information for both views is stored together at the unified undo stack. When an undo command is receive from either view, appropriate undo units for each view are applied to each view respectively.

20 Claims, 3 Drawing Sheets

SYNCHRONIZING UNDO/REDO OPERATIONS BETWEEN DIFFERENT DOCUMENT VIEWS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides a Web page containing the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

With the various types of content that can be included and in a Web page as well as interactions between the types of content, Web page development environments can include multiple document views designing a Web page. For example, many development environments include a code (or text) view of the Web page and a design (or graphical view) of the Web page. In these environments, the design view reflects what a browser can (or will likely) render from processing the code (e.g., HTML tags, scripts, etc) of the code view. Thus, as a developer modifies code in the code view, the developer can see how the modified code is likely to be rendered at a Web browser. From the combination of views, the developer may be able to develop Web pages more efficiently.

Most editors (including those in Web page development environments) make use of a document-view-controller model where the view binds to the document for presenting data to the users. As such, most editors include at least some limited mechanism for undoing previously entered changes (e.g., adding, modifying, or deleting one or more of text, graphics, font characteristics, etc.) to move a document to a previous state. For example in some environments, a key combination of "CTRL-Z" (i.e., holding down the CTRL key and then pressing the Z key) will undo previously entered changes.

As changes are made to a document, an editor can generate and store corresponding undo information in an undo stack. Newer changes are inserted at the top of the stack such that older changes are pushed down the stack as newer changes are inserted. Using an undo stack an editor can undo a series of sequentially entered changes in essentially an inverse order from the order the changes were made. That is, invoking an undo command (e.g., CTRL-Z) undoes the most recently entered change. Subsequent invocations of the undo command sequentially undo less recent changes.

Further, as previously described, Web page development environments can present multiple different views of data to a developer. Unfortunately, each view can have a different document architecture representing how documents are stored internally. Thus, a document-view binding for each view can have a different way of retrieving the data from corresponding document objects respectively. Accordingly, since each document architecture is different, each document architecture can also have a different way of exposing a corresponding undo stack.

Thus, if a developer switches views (e.g., from code view to design view), the undo stack may behave completely different. For example, a code view may permit a developer to undo five prior operations on the document. However, a corresponding design view may permit a developer to undo only one operation on the document. These differing undo stack behaviors can be confusing to a developer and can delay Web page development.

Further, in some environments, the maintenance of two separate undo stacks can unnecessarily consume computer system resources by sending superfluous change notifications. This result is at least in part due to the number of recorded changes in a first view not necessarily corresponding to an equivalent number of changes in a second view. For example, entering the text <img src="testimage.jpg"> into in a code view has limited, if any, meaning in the design view until the '>' is entered into the code view. When the '>' is entered in the code view, the design view may then display the image testimage.jpg. Thus, while the code view may require separate portions of undo information for each entered character of the text, the design view may require only a single portion of undo information corresponding to deletion of the '>' character. Nonetheless, the code view can continue to send change notifications to the second view (thereby consuming computer system resources) to permit the design view to generate corresponding undo operations, even though no corresponding undo operations are in fact needed in the design view until the '>' character is entered.

In some editors, a redo operation (or undo undo operation) can be entered into an undo stack (or separate redo stack) when an undo operation is removed from the stack and performed. A redo command can be invoked (e.g., through some other key combination) to undo an undo operation and move the document to a forward state. In multiple view environments, a series of unnecessarily generated undo operations can in turn lead to unnecessarily generated redo operations. For example, referring back to the image entry example, undo operations in the code view to delete the text '<img src="testimage.jpg"' can cause corresponding unnecessarily generated (and potentially empty) undo operations to be executed in the design view. Execution of the undo operations in the design view can cause corresponding unnecessary (and potentially empty) redo operations to be generated for the design view.

BRIEF SUMMARY

The present invention extends to methods, systems, and computer program products for synchronizing undo/redo operations between different document views. In some embodiments, undo operations for a document are synchronized between first and second document views having different document architectures. A computer system detects a change to the document in the first view. The first view creates a global undo unit in a unified undo stack. The unified undo stack is accessible to and configured for compatible interaction with both the first view and the second view.

The first view inserts a first view undo operation for the detected change into the global undo unit. The first view notifies the second view of the detected change such that the detected change can be synchronized between the first view and the second view. The first view receives a notification that the second view has inserted a corresponding appropriate second view undo unit into the global undo unit such that undo operations for undoing the detected change are unified in the global undo unit.

In other embodiments, undo operations are uniformly applied at a first and second document view. A computer system loads corresponding representations of a document into the first view and second view of an editor respectively. The document representations are loaded according to the different document architectures for the first and second view. The computer system detects invocation of an undo command at the first view. The undo command is invoked to undo a change previously entered into the document.

The computer system accesses a global unit undo from a unified undo stack. The global undo unit includes a first view undo unit and a corresponding second view undo. The first view undo unit contains first undo information for undoing the previously entered document change in the first view and the second view undo unit contains second undo information for undoing the previously entered document change in the second view. The computer system applies the first undo information to the loaded representation of the document in the first view. The computer system applies the second undo information to the loaded representation of the document in the second view such that the second view is consistent with any modifications to the document in the first view caused from applying the first undo information to the first view.

Generally, a unified undo stack is configured to store undo units from different document views such that the undo information for a document change is uniformly contained in the same global undo unit. Corresponding undo units for different document views can be accessed from a global undo unit and applied so that changes to document views from performing undo operations are consistent.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for synchronizing undo/redo operations between different document views. In some embodiments, undo operations for a document are synchronized between first and second document views having different document architectures. A computer system detects a change to the document in the first view. The first view creates a global undo unit in a unified undo stack. The unified undo stack accessible to and configured for compatible interaction with both the first view and the second view.

The first view inserts a first view undo operation for the detected change into the global undo unit. The first view notifies the second view of the detected change such that the detected change can be synchronized between the first view and the second view. The first view receives a notification that the second view has inserted a corresponding appropriate second view undo unit into the global undo unit such that undo operations for undoing the detected change are unified in the global undo unit.

In other embodiments, undo operations are uniformly applied at a first and second document view. A computer system loads corresponding representations of a document into the first view and second view of an editor respectively. The document representations are loaded according to the different document architectures for the first and second view. The computer system detects invocation of an undo command at the first view. The undo command is invoked to undo a change previously entered into the document.

The computer system accesses a global unit undo from a unified undo stack. The global undo unit includes a first view undo unit and a corresponding second view undo. The first view undo unit contains first undo information for undoing the previously entered document change in the first view and the second view undo unit contains second undo information for undoing the previously entered document change in the second view. The computer system applies the first undo information to the loaded representation of the document in the first view. The computer system applies the second undo information to the loaded representation of the document in the second view such that the second view is consistent with any modifications to the document in the first view caused from applying the first undo information to the first view.

Generally, a unified undo stack is configured to store undo units from different document views such that the undo information for a document change is uniformly contained in the same global undo unit. Corresponding undo units for different document views can be accessed from a global undo unit and applied so that changes to document views from performing undo operations are consistent.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and the following claims, an "undo operation" is defined as an operation that causes a document view to revert (or go back) to a prior state.

In this description and the following claims, "undo information" is information in a specified document architecture format for implementing a corresponding undo operation in the specified document architecture.

In this description and the following claims, an "redo operation" is defined as an operation that causes a document view to advance (or go forward) to a prior state. A redo operation can be used to undo an undo operation and return a document to a state before the undo operation was performed. Generally, a redo operation can also be viewed as an undo operation since a redo operation is used to undo an existing document state.

In this description and the following claims, "redo information" is information in a specified document architecture format for implementing a corresponding redo operation in the specified document architecture. Generally, redo information can also be viewed as undo information since redo information is used for implementing a redo operation to undo an existing document state.

Throughout the description and claims, reference is made to undo operations and undo information. Due to the nature of redo operations and redo information, it should be understood that undo operations include redo operations and that undo information includes redo information.

Figure 1:
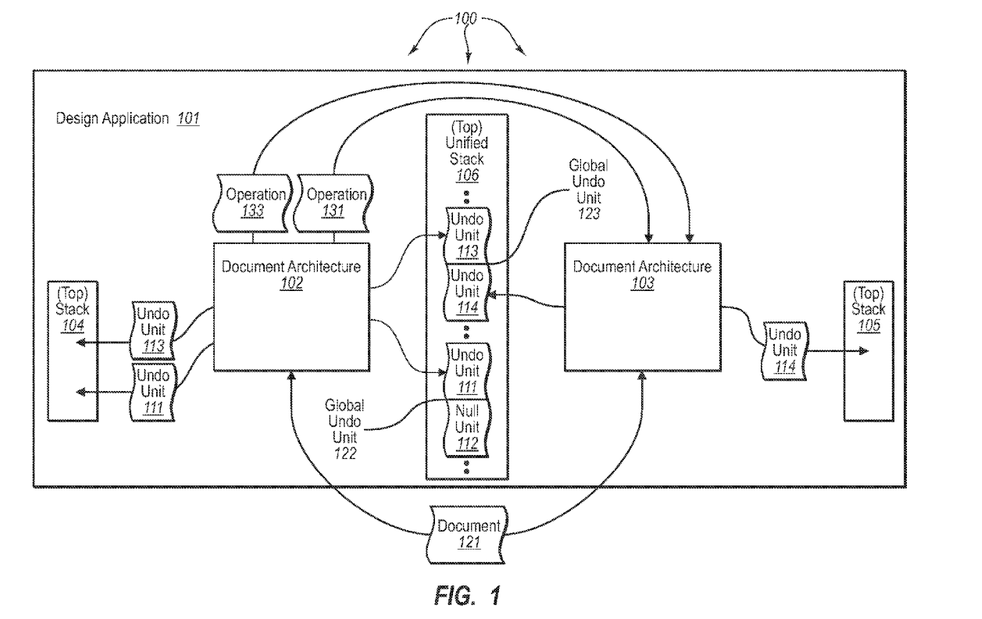
FIG. 1 illustrates an example computer architecture that facilitates for synchronizing undo/redo operations between different document views.

FIG. 1 illustrates an example computer architecture that facilitates synchronizing undo/redo operations between different document views. As depicted, computer architecture 100 includes design application 101, such as, for example, an application to design Web pages. Design application 101 includes document architecture 102 and document architecture 103. Document architectures 102 and 103 can have different formats for internally storing and representing documents loaded into design application 101.

Thus, when document 121 is loaded into design application 101, document architecture 102 can store and represent document 121 in one format and document architecture 103 can store and represent document 121 in another different format. For example, if document 121 were a Web page document, document architecture 102 can store and represent a code (or text) view of document 121. On the other hand, document architecture 103 can store and represent a design (or graphical) view of document 121. In these environments, the design view can reflect what a browser can (or will likely) render from processing the code (e.g., HTML tags, scripts, etc) of the code view.

Each of the document architectures can also maintain an architecture specific undo stack. Generally, a stack can be a first in last out (FILO) data structure. For example, document architecture 102 can maintain stack 104 and document architecture 103 can maintain stack 105. When document architecture 102 performs an operation, document architecture 102 can store an undo operation and corresponding undo information in undo stack 104. For example, when a first character of text is added to a code view of document 121, document architecture 102 can store undo unit 111 in stack 104. Undo unit 111 can contain an undo operation and corresponding undo information for reverting the code view of document 121 to a state prior to the addition of the first character of text (e.g., deleting the character of text). When document architecture 102 performs a subsequent operation, document architecture 102 can store another undo operation and corresponding undo information in stack 104. For example, when a second character of text is added to a code view of document 121, document architecture 102 can store undo unit 113 in stack 104. Undo unit 113 can contain an undo operation and corresponding undo information for reverting the code view of document 121 to a state prior to the addition of the second character of text (e.g., deleting the second character of text). For example, the code view can be reverted to a state after the first character of text was added.

Similarly, when document architecture 103 performs an operation, document architecture can store an undo operation and corresponding undo information in undo stack 105. For example, when a completed HTML tag is detected (e.g., as a result of the addition of the second character of text in the code view) and subsequently rendered in a design view, document architecture 103 can store undo unit 114 in stack 105. Undo unit 114 can contain an undo operation and corresponding undo information for reverting the rendered design view of document 121 to a state prior to the addition of the completed HTML tag (e.g., ceasing to display an image at a display device).

Additionally or alternatively, when a document architecture performs an operation, the document architecture can also submit an undo unit to unified stack 106. Unified stack 106 can be accessible to and configured to compatibly interoperate with both document architecture 102 and document architecture 103.

For example, in addition or alternatively to storing undo unit 111 in stack 104, document architecture 102 can also submit undo unit to unified stack 106. When unified stack 106 receives an architecture specific undo unit (e.g., including an undo operation and corresponding undo information) from a document architecture, unified stack 106 can create a global undo unit. Unified stack 106 can insert the architecture specific undo unit into the global undo unit. For example, unified stack 106 can create global undo unit 122 and insert undo unit 111 into global undo unit 122.

Design application 101 can transfer an indication of the operation that caused an undo unit to be generated for one document architecture to the other document architecture. For example, design application 101 can transfer operation 131 to document architecture 103 to indicate that the performance of operation 131 at document architecture 102 caused undo unit 111 to be stored in unified stack 106.

In response to receiving an indicated operation, a receiving document architecture can determine if the indicated operation alters the current rendering of a loaded document. For example, document architecture 103 can determine if performance of operation 131 alters a current rendering of document 121. Depending on differences in document architectures, performance of an operation at one document architecture may not alter the rendering of the document in another document architecture. For example, if operation 131 indicates the addition of the next to last character of text of an HTML tag, this may have no impact on a graphical view of document 121 (i.e., when adding the character does not result in a complete HTML tag).

Thus, it may be that document architecture does not create an undo unit in response to receiving operation 131. Accordingly, null unit 112 (an empty undo unit) can be inserted into global undo unit 122. This essentially indicates that if document architecture 102 receives an undo command to undo operation 131, no corresponding undo operation need be performed at document architecture 103. Unified stack 106 may wait for an undo unit from architecture 103 for a specified time or until a next undo unit is received from document architecture 102.

Subsequently, document architecture 102 can perform operation 133. Document architecture 102 can store undo unit 113 (e.g., an undo operation and corresponding undo information) for undoing operation 133. Document architecture 103 can also submit undo unit 113 to unified stack 106. Thus, in response to receiving undo unit 113, unified stack 106 can insert null unit 112 into global undo unit 122. Also, unified stack 106 can create global undo unit 123 and insert undo unit 113 into global undo unit 123.

Design application 101 can transfer operation 133 to document architecture 103 to indicate that the performance of operation 133 at document architecture 102 caused undo unit 113 to be stored in unified stack 106. Document architecture 103 can determine if performance of operation 133 alters a current rendering of document 121. Depending on differences in document architectures, performance of an operation at one document architecture can alter the rendering of the document in another document architecture. It may be that operation 133 indicates the addition of the last character of text to an HTML tag, thereby completing the HTML tag. Thus, processing the completed HTML tag and rendering any results can alter a graphical view of document 121. For example, adding the last character (in document architecture 102) to an HTML tag for inserting an image into a Web page can cause document architecture 103 to render the image.

Since operation 133 alters the rendering of document 121, document architecture 103 can create an undo unit for undoing operation 133. For example, document architecture 103 can create undo unit 114 (e.g., an undo operation and corresponding undo information) such that if the character of text completing the HTML tag is removed in document architecture 102, the image is no longer rendered in document architecture 103. Document architecture 103 can store undo unit 114 in stack 105. Document architecture 103 can also submit undo unit 114 to unified stack 106. Unified stack 106 can insert undo unit 114 into global undo unit 123.

Subsequently, if an undo (or redo) command is received from either of document architecture 102 and 103, design application 101 can refer to the appropriate global undo unit to appropriately revert the corresponding views of document 121 to a prior state. For example, if an undo command at document architecture 102 indicates the addition of the last character of text completing the HTML tagged is to be undone, design application 101 can refer to global undo unit 123. Document architecture 102 can extract and apply undo unit 113 (removing the last character of text completing the HTML tag). Similarly, document architecture 103 can extract and apply undo unit 114 (removing the rendered image). Undo units for different document architectures can be applied at essentially the same time such that different document views remain consistent.

If another undo command is received, design application can refer to the next appropriate global undo unit to appropriately revert the corresponding views of document 121 to a prior state. For example, if another undo command at document architecture 102 indicates the addition of the next to last character of text completing the HTML tag is to be undone, design application 101 can refer to global undo unit 122. Document architecture 102 can extract and apply undo unit 111 (removing the next to last character of text completing the HTML tag). Document architecture 103 detects null unit 112 indicating that removing the next to last character of text does not alter a graphical rendering of document 121.

Figure 2A:
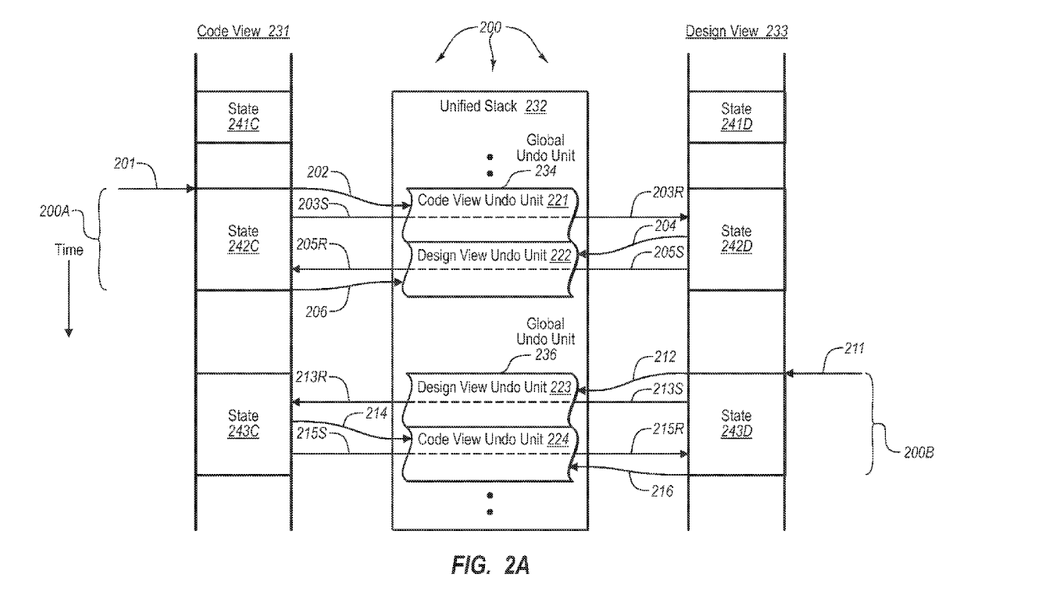
FIG. 2A illustrates a data flow of example methods for synchronizing undo operations between first and second document views.

FIG. 2A illustrates a data flow 200 of example methods 200A and 200B for synchronizing undo operations between first and second document views. As depicted in data flow 200, code view 231 and design view 233 are in state 241C and state 241D respectively. Code (or text) view 231 and design (or graphical) view 233 represent different views of a loaded document.

Method 200A includes an act of detecting a change to the document in the first view (act 201). For example, an editor can detect user-input editing code view 231. Upon detecting the change, code view 231 transitions to state 242C.

Method 200A includes an act of creating a global undo unit in a unified undo stack, the unified undo stack accessible to and configured for compatible interaction with both the first view and the second view. For example, code view 231 can create global undo unit 234 in unified stack 232. Unified stack 232 can be accessible to and configured for compatible interaction with the document architectures of both code view 231 and design view 233. Method 200A includes an act of the first view inserting a first view undo operation for the detected change into the global undo unit (act 202). For example, code view 231 can insert code view undo unit 221 into global undo unit 234. Code view undo unit 221 can include an undo operation and corresponding undo information for undoing the change detected in act 201 at code view 231.

Method 200A includes an act of the first view notifying the second view of the detected change such that the detected change can be synchronized between the first view and the second view (act 203S). For example, code view 231 can notify design view 233 of the change detected at act 201 such that the detected change can be synchronized between code view 231 and design view 233.

Method 200A includes an act of the second view receiving notification of the detected change form the first view such that the detected change can be synchronized between the first view and the second view (act 203R). For example, design view 233 can receive notification of the change detected at act 201 from code view 231. Design view 233 can process the notification causing design view 233 to transition to state 242D. States 241D and 242D may or may not be the same state. If the change detected at act 201 is a textual change that does not alter graphical rendering of the loaded document, states 241D and 242D can be the same state. On the other hand, if the change detected at act 201 is a textual change that alters the graphical rendering of the loaded document, states 241D and 242D are different states.

As depicted in method 200A, design view 233 determines that the detected change does alter the graphical rendering of the loaded document. Thus, state 242D differs from state 241D. Accordingly, method 200A includes an act of the second view inserting a second view undo operation corresponding to the detected change into the global undo unit (act 204). For example, design view 233 can insert design view undo unit 222 into global undo unit 234. Design view undo unit 222 can include an undo operation and corresponding undo information for undoing the change detected in act 201 at design view 233.

However, when design view 233 determines that the detected change does not alter the graphical rendering of the loaded document, unified stack 232 can insert a null (empty) unit for design view 233 into global undo unit 234.

Method 200A includes an act of the second view notifying the first view that it has inserted a corresponding undo unit into the global undo unit (act 205S). For example, design view 233 can notify code view 231 that design view 233 inserted design view undo unit 222 in global undo unit 234. Method 200 includes an act of the first view receiving a notification that the second view has inserted a corresponding appropriate second view undo unit into the global undo unit such that undo operations for undoing the detected change are unified in the global undo unit (act 205R). For example, code view 231 can receive the notification from design view 223 that design view 223 inserted design view undo unit 222 into global undo unit 234. Thus, undo units for code view 231 and design view 233 (for undoing the change detected at act 201) are unified in global undo unit 234.

Method 200A includes an act of the first view closing the global undo unit (act 206). For example, code view 231 can close global undo unit 234.

Method 200B is similar to method 200A with the perspectives of code view 231 and design view 233 reversed.

Method 200B includes an act of detecting a change to the document at design view 233 (act 211). For example, design view 233 can detect a change in font characteristic of displayed characters, deletion of an image, addition of a user-interface control, etc. Upon detecting the change, code view 231 transitions to state 243D. Method 200B includes an act of design view 233 creating global undo unit 236 in unified stack 232. Method 200B includes design view 233 inserting design view undo unit 223 into global undo unit 236 (act 212). Design view undo unit 223 can include an undo operation and corresponding undo information for undoing the change detected in act 211 at design view 233.

Method 200B includes an act of design view 233 notifying code view 231 of the change detected at act 211 such that the detected change can be synchronized between design view 233 and code view 231 (act 213S). Method 200B includes an act of code view 231 receiving notification of the change detected at act 211 from design view 233. Code view 233 can process the notification causing code view 231 to transition to state 243C. States 242C and 243C may or may not be the same state. If the change detected at act 211 is a change that does not alter textual rendering of the loaded document (e.g., a yet to be completed change to font characteristics), states 242C and 243C can be the same state. On the other hand, if the change detected at act 211 is a change that alters the textual rendering of the loaded document (e.g., removal of an image), states 241D and 242D are different states.

In method 200B, code view 231 determines that the detected change does alter the textual rendering of the loaded document. Thus, state 242D differs from state 241D. Accordingly, method 200B includes an act of code view 231 inserting code view undo unit 224 into global undo unit 236 (act 214). Code view undo unit 224 can include an undo operation and corresponding undo information for undoing the change detected in act 211 at code view 231.

However, when code view 231 determines that the detected change does not alter the textual rendering of the loaded document, unified stack 232 can insert a null (empty) unit for design view 231 into global undo unit 236.

Method 200B includes an act of code view 231 notifying design view 231 that code view 233 inserted code view undo unit 224 in global undo unit 236 (act 215S). Method 200 includes an act of design view 233 receiving the notification from code view 231 that code view 221 inserted code view undo unit 224 into global undo unit 236 (act 215R). Thus, undo units for design view 233 and code view 231 (for undoing the change detected at act 211) are unified in global undo unit 236.

Method 200B includes an act of design view 233 closing global undo unit 236 (act 216).

Figure 2B:
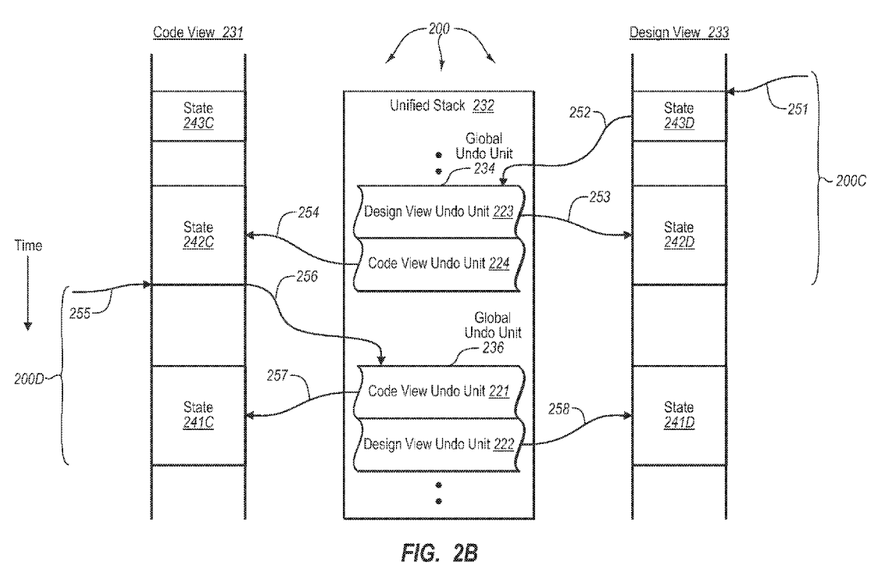
FIG. 2B illustrates a data flow of example methods for uniformly performing undo operations at first and second document views.

Thus, when subsequent undo (or redo) commands are received, code view 231 and design view 233 can be transitioned between document states in a consistent manner. FIG. 2B illustrates data flow 200 of example methods 200C and 200D for uniformly performing undo operations at first and second document views.

Prior to receiving an undo command, methods 200C and 200D include an act of load corresponding representations of a document into first view and second view of the editor respectively, the document representations are loaded according to the different document architectures for the first and second view. For example, representations of a document can be loaded into code view 221 and design view 233 according to different underlying document architectures.

Method 200C includes an act of detecting invocation of an undo command at the first view, the undo command invoked to undo a change previously entered into the document (act 251). For example, design view 233 can detect invocation of an undo command to undo the operation detected at act 211 of method 200B.

Method 200C includes an act of accessing a global unit undo from a unified undo stack, the global undo unit including a first view undo unit and a corresponding second view undo, the first view undo unit containing first undo information for undoing the previously entered document change in the first view, the second view undo unit containing second undo information for undoing the previously entered document change in the second view (act 252). For example, design view can access global undo unit 234 from unified undo stack 232. Global undo unit 234 includes design view undo unit 223 for undoing the previously detected document change at act 211 within design view 233. Likewise, global undo unit 234 includes code view undo unit 224 for undoing the previously detected document change at act 211 within code view 231.

Method 200C includes an act of applying the first undo information to the loaded representation of the document in the first view (act 253). For example, design view 233 can apply design view undo unit 223 to a loaded representation of the document in design view 233. Design view undo unit 223 can include an undo operation and corresponding undo information for causing design view 233 to transition from state 243D back to state 242D.

Method 200C includes an act of applying the second undo information to the loaded representation of the document in the second view such that the second view is consistent with any modifications to the document in the first view caused from applying the first undo information to the first view (act 254). For example, code view 231 can apply code view undo unit 224 to a loaded representation of the document in code view 231. Code view undo unit 224 can include an undo operation and corresponding undo information for causing code view 231 to transition from state 243C back to state 242C. Application of design view undo unit 223 to design view 233 and code view undo unit 224 to code view 231 results in modifications to code view 231 being consistent with modifications to design view 233.

Method 200D is similar to method 200C with the perspectives of code view 231 and design view 233 reversed.

Method 200D includes an act of code view 231 detecting invocation of an undo command to undo the operation detected at act 201 of method 200A (act 255). Method 200D includes an act of code view 231 accessing global undo unit 236 from unified undo stack 232 (act 256). Global undo unit 236 includes code view undo unit 221 for undoing the previously detected document change at act 201 within code view 231. Likewise, global undo unit 234 includes design view undo unit 222 for undoing the previously detected document change at act 201 within design view 233.

Method 200D includes an act of code view 231 can applying code view undo unit 221 to a loaded representation of the document in design view 233 (act 257). Design view undo unit 223 can include an undo operation and corresponding undo information for causing code view 231 to transition from state 242C back to state 241C. Method 200D includes an act of design view 233 applying design view undo unit 222 to a loaded representation of the document in design view 233 (act 258). Design view undo unit 222 can include an undo operation and corresponding undo information for causing code view 231 to transition from state 243C back to state 242C. Application of code view undo unit 221 to code view 231 and design view undo unit 222 to design view 233 results in modifications to design view 233 being consistent with modifications to code view 231.

Accordingly, embodiments of the present invention can include a computer system having one or more processors, system memory, and one or more physical computer-readable media. The one or more physical computer-readable media can have stored thereon computer-executable instructions comprising an editor and a unified undo stack.

The editor can be configure to load a document into a plurality of document views including a first view and a second view. The first view and the second view can have different document architectures for representing documents loaded into the editor. For example, an editor can load a code view of a Web page according to one document architecture and can load a design view of the Web page according to different document architecture.

The unified undo stack can be configured to receive global undo unit creation commands from either of the first and second views. For example, a unified undo stack can be configured to receive global undo unit creation commands for a Web page from either a code view or a design view. The unified undo stack can be configured to create global undo units in response to global undo unit creation commands. For example, unified undo stack can create global undo units in response to global undo unit creation commands from either the code view or the design view.

The unified undo stack can be configured to insert first view undo units from the first view into created global undo units, the first undo units including first undo information for undoing document changes in the first view. For example, the unified undo stack can insert code view undo units from the code view into global undo units. The code view undo units can include undo information for undoing document changes in the code view.

The unified undo stack can be configured to insert second view undo units from the second view into created global undo units, the second undo units including second undo information for undoing document changes in the second view. For example, the unified undo stack can insert design view undo units from the design view into global undo units. The design view undo units can include undo information for undoing document changes in the design view. Accordingly, undo information for a document change is uniformly contained in the same global undo unit.

The unified undo stack can be configured to receive undo commands from either of the first and second views for undoing previously entered document changes. For example, the unified undo stack can receive undo commands form either a code view or a design view of a Web page. The unified undo stack can be configured to access the appropriate global undo unit corresponding to the undo command. For example, the unified undo stack can access the top most global undo unit in response to an undo command from either the code view or the design view.

The unified undo stack can be configured to apply the first undo information contained in the accessed global undo unit to the first view. For example, the unified undo stack can apply code view undo information contained in an access global undo unit to the code view. The unified undo stack can be configured to apply the second undo information contained in the accessed global undo unit to the second view. For example, the unified undo stack can apply design view undo information contained in an access global undo unit to the design view. Accordingly, modifications to the code view and design view are consistent with one another.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including an editor having a plurality of document views including a first view and a second view for representing a document, the first view and the second view having different document architectures for representing documents loaded into the editor such that the same document is displayed differently in the first and second view, a method for synchronizing undo operations between the first and second view, the method comprising:
    an act of detecting a change made to the document in the first view;
    an act of the first view creating a global undo unit in a unified undo stack, the unified undo stack accessible to and configured for compatible interaction with both the first view and the second view;
    an act of the first view inserting a first view undo operation for the detected change into the global undo unit, the first view undo unit containing instructions for undoing the change made to the document in the first view;
    an act of the first view notifying the second view of the detected change;
    an act of the second view inserting a second view undo operation that corresponds to the first view undo operation into the global undo unit, the second view undo operation containing instructions for undoing the change to the document in the second view;
    an act of the first view receiving a notification that the second view has inserted the second view undo operation into the global undo unit such that undo operations for undoing the detected change are unified in the global undo unit.

2. The method as recited in claim 1, wherein the act of detecting a change to the document in the first view comprises an act of detecting a change to the document in the first view, wherein the first view is selected from among a code view and a design view.

3. The method as recited in claim 1, wherein the act of detecting a change to the document in the first view comprises an act of detecting a change to a Web page document.

4. The method as recited in claim 1, wherein the act of the first view creating a global undo unit in a unified undo stack comprises an act of creating a global undo unit in a unified undo stack that is compatible with the document architectures of both the first and second views.

5. The method as recited in claim 1, wherein the act of the first view inserting a first view undo operation for the detected change into the global undo unit comprises an act of a code view inserting a code view undo operation for undoing a textual change to a Web page document.

6. The method as recited in claim 1, wherein the act of the first view inserting a first view undo operation for the detected change into the global undo unit comprises an act of a design view inserting a design view undo operation for undoing a graphical change to a Web page document.

7. The method as recited in claim 1, further comprising:
    an act of the second view determining that the detected change alters how the document is rendered at the second view subsequent to the first view notifying the second view of the detected change.

8. The method as recited in claim 1, wherein an act of the first view notifying the second view of the detected change comprises a code view notifying a design view of a textual change to a Web page document.

9. The method as recited in claim 1, wherein an act of the first view notifying the second view of the detected change comprises a design view notifying a code view of a graphical change to a Web page document.

10. At a computer system including an editor having a plurality of document views including a first view and a second view for representing a document, the first view and the second view having different document architectures for representing documents loaded into the editor such that the same document is displayed differently in the first and second view, a method for uniformly performing undo operations at the first and second view, the method comprising:
    an act of loading corresponding representations of a document into the first view and second view of the editor respectively, the document representations loaded according to the different document architectures for the first and second view;
    an act of detecting invocation of an undo command at the first view, the undo command invoked to undo a change previously entered into the document;
    an act of accessing a global undo unit from a unified undo stack, the global undo unit including a first view undo unit and a corresponding second view undo unit, the first view undo unit containing first undo information for undoing the previously entered document change in the first view, the second view undo unit containing second undo information for undoing the previously entered document change in the second view;
    an act of applying the first undo information to the loaded representation of the document in the first view; and
    an act of applying the second undo information to the loaded representation of the document in the second view such that the second view is consistent with any modifications to the document in the first view caused from applying the first undo information to the first view.

11. The method as recited in claim 10, wherein the act of loading corresponding representations of a document into the first view and second view of the editor respectively comprises an act of loading corresponding representations of a Web page document into a code view and into a design view respectively.

12. The method as recited in claim 10, wherein the act of detecting invocation of an undo command at the first view comprises an act of detecting invocation of an undo command in a code view of a Web page.

13. The method as recited in claim 10, wherein the act of detecting invocation of an undo command at the first view comprises an act of detecting invocation of an undo command in a design view of a Web page.

14. The method as recited in claim 10, wherein the act of applying the first undo information to the loaded representation of the document in the first view comprises an act of transitioning the loaded representation of the document in the first view to a state prior to a previously entered change in the first view.

15. The method as recited in claim 10, wherein the act of applying the second undo information to the loaded representation of the document in the second view comprises an act of transitioning the loaded representation of the document in the second view to a state prior to a previously entered change in the first view.

16. The method as recited in claim 10, further comprising:
an act of determining that the accessed global unit includes the second undo information such that transitioning the second view to a state prior to a previously entered change in the first view is necessary.

17. A computer storage medium storing the following computer executable components:
an editor configured to load a document into a plurality of document views including a first view and a second view, the first view and the second view having different document architectures for representing documents loaded into the editor; and
a unified undo stack is configured to:
receive global undo unit creation commands from either of the first and second views;
create global undo units in response to global undo unit creation commands;
insert first view undo units from the first view into created global undo units, the first undo units including first undo information for undoing document changes in the first view;
insert second view undo units from the second view into created global undo units, the second undo units including second undo information for undoing document changes in the second view;
wherein first undo units and second undo units containing undo information for undoing a document change in the first and second views respectively are inserted into the same global undo unit such that undo information for the document change is uniformly contained in the same global undo unit;
receive undo commands from either of the first and second views for undoing previously entered document changes;
access the appropriate global undo unit corresponding to the undo command;
apply the first undo information contained in the accessed global undo unit to the first view; and
apply the second undo information contained in the accessed global undo unit to the second view such that the second view is consistent with any modifications to the document in the first view caused from applying the first undo information to the first view.

18. The system as recited in claim 17, wherein the editor is included in a design application for designing Web pages and wherein the editor includes a code view and design view for representing Web pages.

19. The system as recited in claim 17, where the unified undo stack is further configured to:
insert a null unit into a global undo unit for the second view when a detected change to the document in the first view does not impact the rendering of the document in the second view.

20. The system as recited in claim 17, wherein the unified undo stack is further configured to:
insert a null unit into a global undo unit for the first view when a detected change to the document in the second view does not impact the rendering of the document in the first view.

* * * * *